No. 890,629.

PATENTED JUNE 16, 1908.

J. B. ERWIN.
EGG BEATER.
APPLICATION FILED JULY 27, 1906.

WITNESSES:
O. R. Erwin
A. M. Schulz

INVENTOR
James B. Erwin

UNITED STATES PATENT OFFICE.

JAMES B. ERWIN, OF MILWAUKEE, WISCONSIN.

EGG-BEATER.

No. 890,629.   Specification of Letters Patent.   Patented June 16, 1908.

Application filed July 27, 1906. Serial No. 327,978.

*To all whom it may concern:*

Be it known that I, JAMES B. ERWIN, a citizen of the United States, residing at Milwaukee, county of Milwaukee and State of Wisconsin, have invented new and useful Improvements in Egg-Beaters, of which the following is a specification.

My invention relates to improvements in that class of egg beaters in which the beating blades are revolved alternately in opposite directions, the same being revolved in one direction by downward pressure upon the operating handle and in the opposite direction by the recoil of an actuating spring, and it pertains among other things, first, the construction of the beating blades, second, the operating handle, third, the operating shaft by which the blades are revolved, and fourth, to the combination and arrangement of the operating spring which is located between the blades and the handle.

Like parts are represented by the same reference letters throughout the several views.

Figure 3:
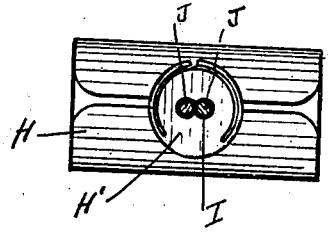
Figure 1:
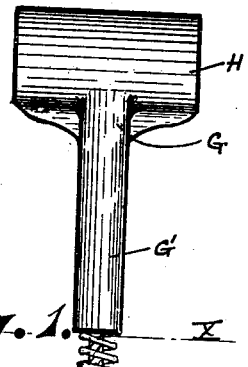
Figure 2:
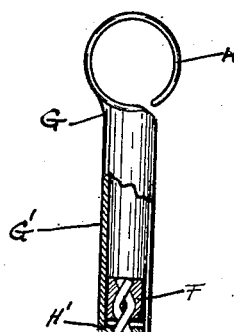
Figure 4:
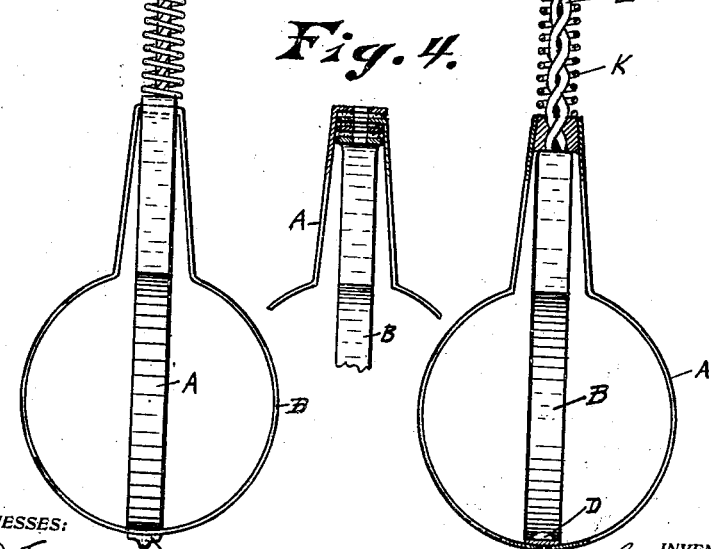

Figure 1 is a side view. Fig. 2 is a similar view part in section, the handle being turned at right angles to that shown in Fig. 1. Fig. 3 is a transverse section drawn on line X X of Fig. 1 from its lower side, and Fig. 4 is a detail showing the preferred means of connecting the upper ends of the beating blades together.

I preferably form my egg beater with two sets of beating blades A and B which are arranged at right angles to each other and rigidly connected together at their upper and lower ends. The upper ends of the blades are preferably connected together as shown in Fig. 4 by solder and the lower ends by rivet D. The rivet D is preferably tapered downward and forms a supporting pivotal bearing L which is adapted to rest on the bottom of the receptacle in which the beater is operated and around which the blades revolve.

For convenience and cheapness of construction the operating shaft E is preferably made of two pieces of wire twisted spirally together around each other when their lower ends are connected rigidly to the upper ends of the beating blades and their upper ends are connected rigidly to a sliding bearing F.

G is the operating handle which is preferably formed integrally from a single piece of metal and comprises the vertical tubular sleeve G' and the horizontal tubular part H.

H' is a fixed bearing for the operating shaft E. The bearing H' is preferably formed integrally with the tubular part G and is provided with an elongated aperture I for the reception of the wires J J of the operating shaft E. The aperture I is so shaped as to engage partially around the respective wires J J of the operating shaft in such a manner that said shaft will be caused to revolve as said bearing H' is moved upwardly and downwardly upon it.

When the beating blades, operating shaft and handle are being assembled as shown in Figs. 1 and 2 a spiral spring K is interposed between the upper end of the beating blades and the lower end of the handle whereby the handle is normally retained at the upper end of the operating shaft as shown in said Figs. 1 and 2. It will now be understood that when the blade supporting pivot L is placed against a smooth surface, such for example as the bottom of an ordinary bowl and the handle is pressed downwardly said shaft and the beating blades connected therewith will be caused to revolve until the operating handle has been brought to the limit of its downward movement against said spring, that as soon as the downward pressure upon the handle is relieved said handle will be thrown upwardly by the recoil of said spring and said beating blades will be thereby revolved in the opposite direction until the handle reaches the limit of its upward movement, the upward movement of the handle being limited by contact of the sliding bearing F of the operating rod with the fixed bearing H' of the handle. It will be obvious that by thus connecting two sets of beating blades rigidly together at right angles to each other they mutually strengthen and support each other while they coöperate in doing the work and a greater amount of work is accomplished with a less number of revolutions and in a shorter period of time than could be accomplished by a single set of blades. It will also be obvious that by thus forming the handle integrally from a single piece of metal comprising vertical and horizontal portions two objects are attained, first, the handle is both stronger and less expensive in construction, while the horizontal portion of the handle aids the user in resisting the turning action of the blades while it affords a neat and convenient means of operating the device.

Heretofore it has been common in somewhat similar devices to locate a shaft actuating spring above the screw operating shaft and to support such spring by and within a tubular sleeve in which case the sleeve is necessary to retain the spring in place, while the length of the sleeve is necessarily equal to the length of the movement of the shaft therein plus the length of the spring when compressed, while by locating the spring around the operating shaft between the sleeve and the handle as shown, a tubular inclosure for the spring becomes unnecessary and the vertical tubular portion of the handle may be made much shorter than would otherwise be required if the spring was as heretofore located therein.

Having thus described my invention what I claim as new and desire to secure by Letters Patent is,

1. In an egg beater the combination of a plurality of beater blades, an operating shaft rigidly affixed at its lower end to the upper end of said blades, an operating handle comprising a tubular sleeve for the reception of the upper end of the operating shaft and a transverse tubular portion for the reception of the hand of the operator formed integrally from a single piece of metal, a spiral spring carried by said operating shaft interposed between the lower end of said handle and the upper end of said beater blades substantially as set forth.

2. In an egg beater the combination of two sets of beater blades, each set comprising two blades, said sets being arranged at right angles to each other, and rigidly connected together at their upper ends with solder and at their lower ends by a rivet, the lower end of said rivet being adapted to serve as a pivotal bearing for said blades, an operating shaft rigidly affixed at its lower end to and terminating at the upper end of said blades, an operating handle slidably attached to the upper end of said operating shaft, and a spiral spring interposed between said blades and the lower end of said operating handle, substantially as and for the purpose specified.

3. In an egg beater the combination of two sets of beater blades, each set comprising two blades, said sets being arranged at right angles to each other, and rigidly connected together at their upper ends with solder and at their lower ends by a rivet, the lower end of said rivet being adapted to serve as a pivotal bearing for said blades, an operating shaft formed of two wires spirally interwound together, said shaft being rigidly affixed at its lower end to the upper end of said blades, an operating handle comprising a tubular sleeve for the reception of the upper end of said operating shaft and a transverse tubular portion for the reception of the hand of the operator formed integrally from a single piece of metal, said handle being slidably attached to the upper end of said operating shaft and a spiral spring interposed between said blades and said operating handle, all substantially as and for the purpose specified.

In testimony whereof I affix my signature in the presence of two witnesses.

JAMES B. ERWIN.

Witnesses:
O. R. ERWIN,
M. M. SCHULZ.